United States Patent [19]

Betz

[11] 4,453,622

[45] Jun. 12, 1984

[54] LOAD STOP DEVICE

[75] Inventor: Ferdinand Betz, Marburg/Lahn, Fed. Rep. of Germany

[73] Assignee: Firma Dr.-Ing. Ludwig Müller & Söhne-Gesellschaft für Bautechnik mbH & Co. KG, Fed. Rep. of Germany

[21] Appl. No.: 287,906

[22] Filed: Jul. 29, 1981

[30] Foreign Application Priority Data

Aug. 8, 1980 [DE] Fed. Rep. of Germany ....... 3030039

[51] Int. Cl.³ ............................................ F16F 65/02

[52] U.S. Cl. ....................................... 188/265; 188/67

[58] Field of Search ..................... 188/31, 67, 69, 110, 188/189, 265; 74/527, 529, 537, 538

[56] References Cited

U.S. PATENT DOCUMENTS 2,834,435 5/1958 Vanderbeck ..................... 188/67 X 2,851,287 9/1958 Tangard ........................... 188/67 X

*Primary Examiner*—Duane A. Reger

*Attorney, Agent, or Firm*—Roberts, Spiecens & Cohen

[57] ABSTRACT

Load support apparatus comprising a housing on which a suspension device is mounted for movement between an operative load suspension position and an inoperative relaxed position. Also mounted on the housing is a holding bolt which is movable between a first position in which a load is supported by the holding bolt and a second position in which the load is released from the bolt. A displaceable locking bar is mounted in the housing for movement transversely of the displacement path of the holding bolt for engaging the bolt to lock the same in the position in which the load is supported by the holding bolt. A catch mechanism is displaceably mounted on the housing for locking the locking bar and a control mechanism responsive to the position of the suspension device operates to displace the catch mechanism to lock the locking bar in the position in which the holding bolt is locked when the suspension device is in its operative load suspension position.

14 Claims, 8 Drawing Figures

LOAD STOP DEVICE

FIELD OF THE INVENTION

The present invention relates to a load stop device which is provided with a movable suspension means, for instance an eye, and has a displaceable holding bolt to support the load, a locking bar which is displaceable under spring pressure being arranged transverse to the direction of the displacement stroke of the holding bolt.

PRIOR ART

Load stop devices, as is known, serve to attach a load with the aid of the displaceable holding bolt. When the holding has engaged the load, the lock bar which is under spring pressure sees to it that the holding bolt cannot again assume its initial position. Only after the locking bar is withdrawn is the holding bolt released so that the load can thus also be released.

The locking bar can be operated by means of a pull rope, but there is the danger that the pull rope will be unintentionally pulled, for instance when the rope catches in some way onto something. In such case the load would be unintentionally released.

SUMMARY OF THE INVENTION

An object of the present invention is to provide a load stop device by which unintentional release of the load is prevented.

In accordance with the invention this object is obtained in the manner that the locking bar can be blocked by a catch whose movement is controlled by the suspension means via control members.

In accordance with one embodiment of the invention, the catch consists of a spring-loaded displacement bolt which is displaceable in a direction transverse to the direction of the stroke of the locking bar. The control members interposed between the suspension means and the catch consist of two double-armed levers which are located one behind the other each of them being swingable about a swivel axis, one lever resting against the displacement bolt and the other against the suspension means, the levers being connected to each other in the manner of a toggle joint.

In this connection the suspension means is provided with a control piece against which one end of a double-armed lever rests. The movable suspension means may be a swingable suspension eye in which case the control piece may be a thickening on the mounting ring of the swingable suspension means.

However, the suspension means may also be a longitudinally displaceable suspension eye, in which case the control piece is a widening on the longitudinally displaceable suspension means adjacent which widening there is a narrowing.

In the embodiment provided with the displacement bolt, the suspension means is suitably displaced upon the taking up of the load, the control members being actuated by the control piece and in turn acting on the displacement bolt which is thereby suitably displaced and engaged in a notch in the locking bar when the locking bar has locked the load-bearing holding bolt in position.

In order that the displacement bolt can carry out a displacement movement upon the lifting of the load stop device without load, the locking bar has a second notch which is arranged behind the first notch. Due to this, the suspension means can be displaced into the same position as when a load is suspended.

In accordance with another embodiment, the catch is a swing lever which is pivoted to the locking bar and the swinging movement of which can be blocked by a control projection which is actuated by the suspension means.

This swing lever can be constructed as a double-armed lever in one illustrative embodiment, the spring-loaded locking bar being pivoted to one arm of said lever while a stop surface which cooperates with the control projection is provided on the other arm of said lever. This stop surface is arranged on the side of the swing lever which is opposite the direction of blocking movement of the swing lever. The control projection is swingable and is connected to the suspension means by a spring, the spring being possibly arranged in a connecting means which is articulated laterally of the swivel axis of the control projection. The return movement of the control projection into the unlocked position is produced by a spring.

BRIEF DESCRIPTION OF THE DRAWINGS

Two illustrative embodiments of the invention are shown in the drawing, in which.

DETAILED DESCRIPTION

Figure 1:
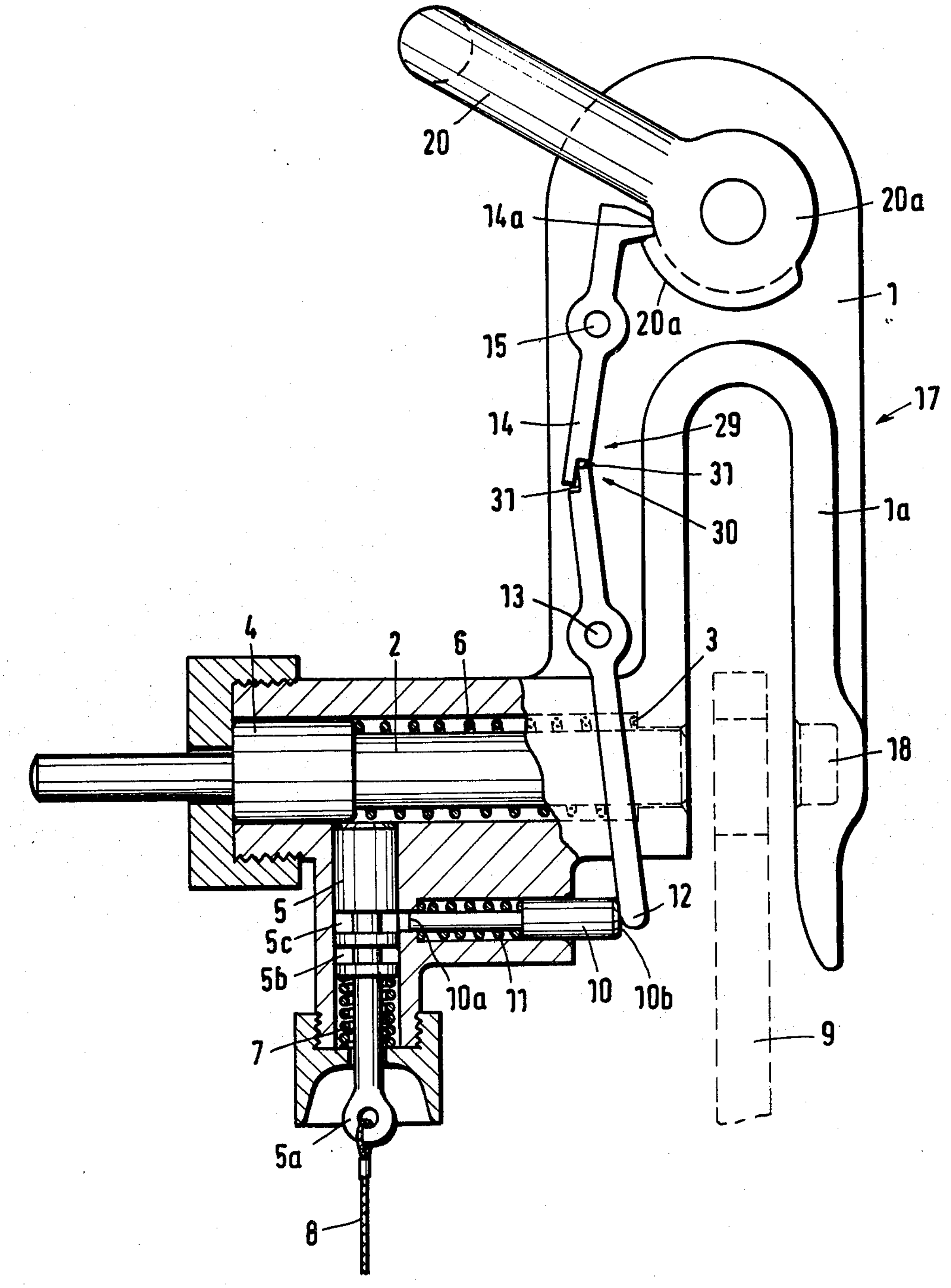
FIG. 1 is a side view, partly broken away in section of an embodiment of the load stop device in which the catch is constructed as a displacement bolt.

The load stop device which is designated generally as 17, consists of a housing 1 which has a curved neck piece **1*a*. A holding bolt 2 for a load 9 is displaceably mounted in the housing 1, the end of the holding bolt 2 being adapted to engage into an end bearing 18 in the neck piece 1*a*. The holding bolt 2 has a collar 4 against which a spring 6 acts. An other end of the spring 6 is supported at 3. The locking bar 5 is arranged for displacement transverse to the direction of the displacement stroke of the holding bolt 2. The locking bar 5 is subjected to the action of a spring 7. The displacement of the locking bar 5 is effected by means of a pull rope 8 which is attached to an eye 5*a* on the locking bar 5. Transverse to the direction of displacement of the locking bar 5 is a catch 10 in the form of a displacement bolt which is subject to the action of a spring 11**.

Between a swingable suspension means in the form of an eye 20 and the catch in the form of the displaceable displacement bolt 10, control members, designated generally by numeral 29, are interposed. These control members consist of two double-armed levers 12 and 14 arranged one behind the other and swingable about swivel shafts 13 and 15 respectively. These levers 12 and 14 are connected to each other in toggle-like manner at 30, the ends of the levers having self-locking cutouts 31.

One end of the lever 12 rests against the displacement bolt 10 at **10*b*. The other lever 14 has a nose piece 14*a*** which rests against the swingable suspension means. The swingable suspension means has a control piece which is in the form of a thickening on the bearing ring 20*a* of the swingable suspension means 20.

Figure 2:
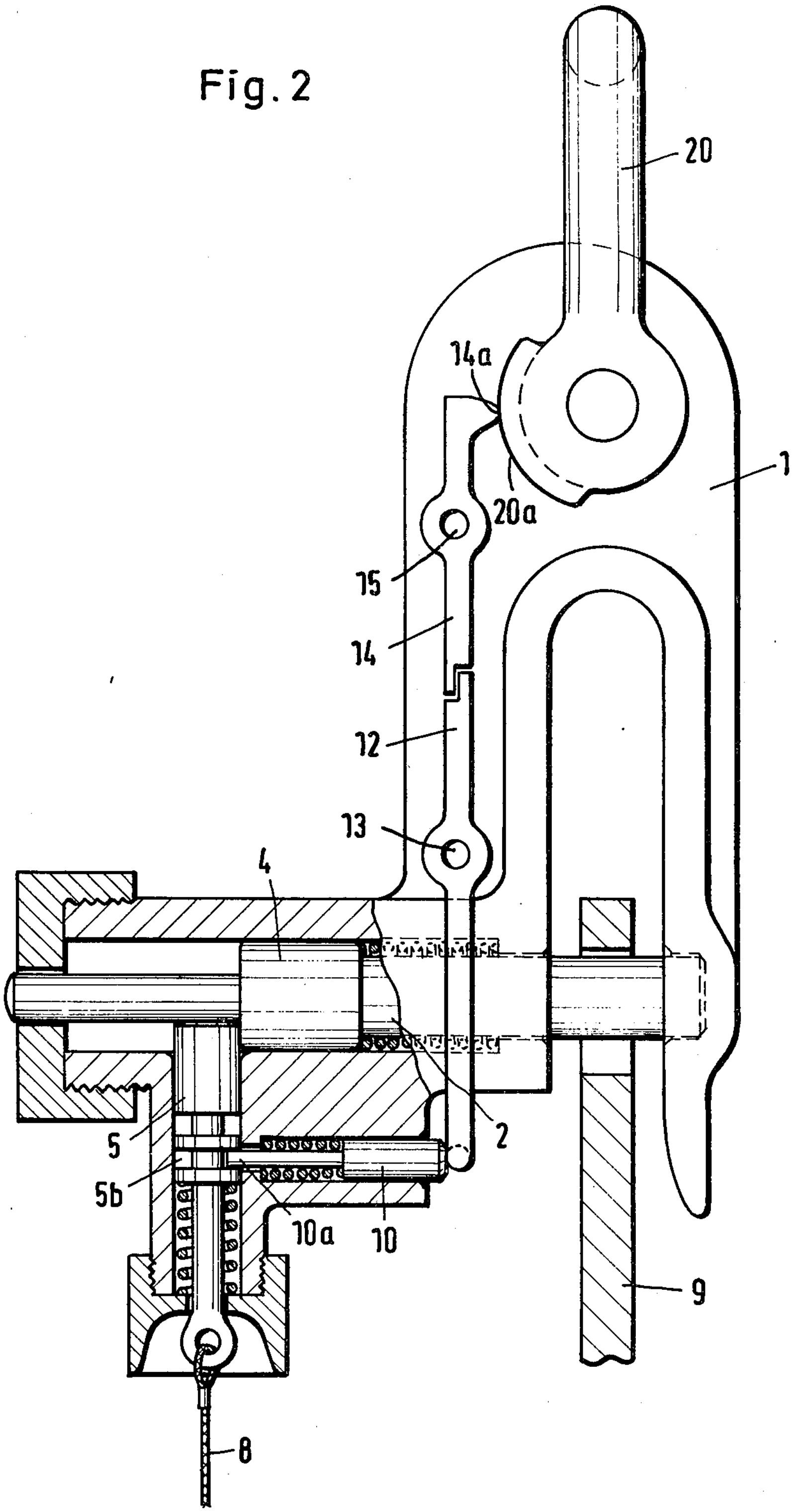
FIG. 2 shows the load stop device with the holding bolt in locked position.
Figure 3:
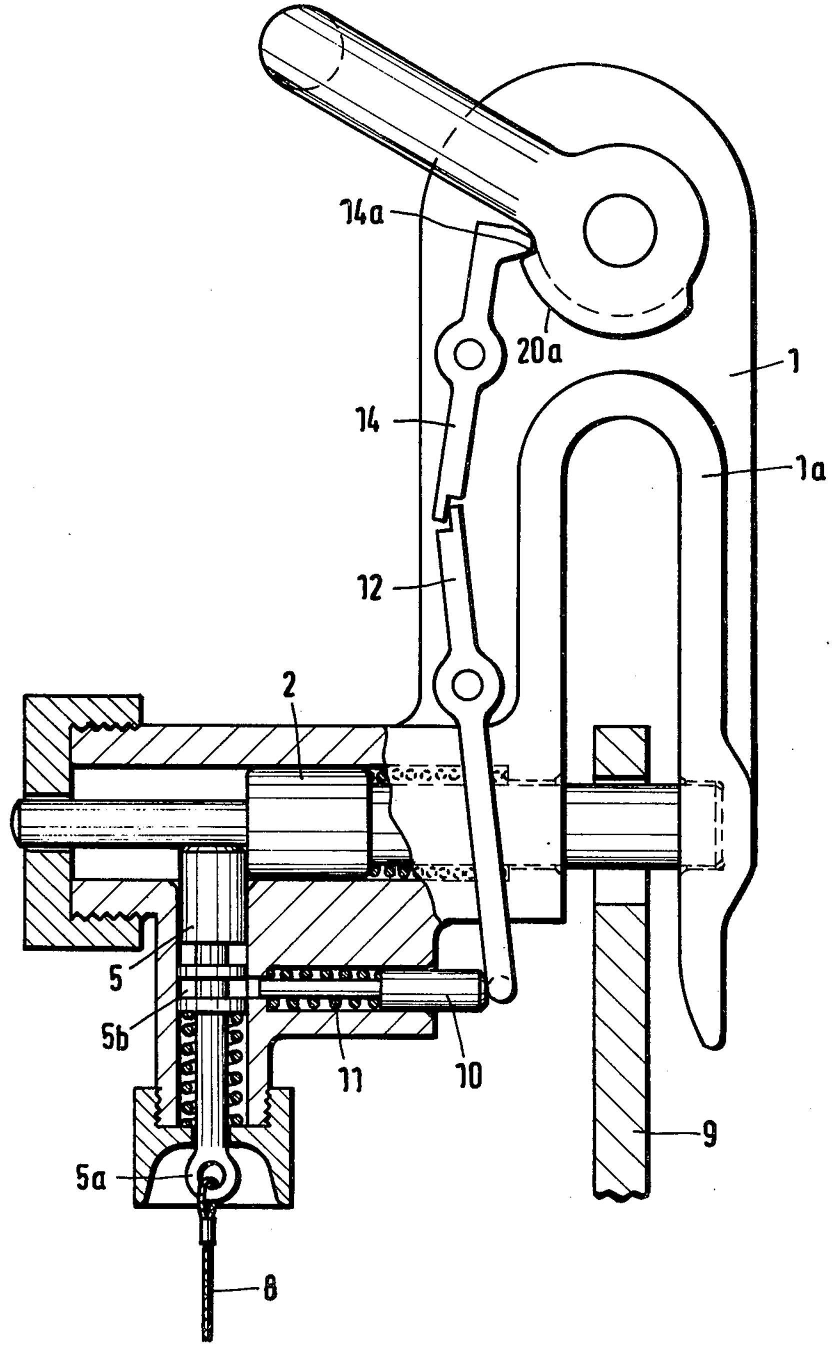
FIG. 3 shows the load stop device with the holding bolt locked, but the locking bar freely movable.

FIG. 1 shows the load stop device before the engaging of the load. The loading bolt 2 has assumed the release position. If the holding bolt 2 is displaced, e.g. manually, it engages the load 9 and passes into the end socket 18 (see FIG. 2). In this case the locking bar 5 has also locked the holding bolt 2 since said bar is under the force of the spring 7. Upon the lifting of the load, the swingable suspension means 20 is swung. This has the result that the nose piece 14*a* passes onto the thickened portion of the bearing ring of the suspension means. In this way a swinging of the control members, namely the levers 12 and 14, is effected with the result that the displacement bolt 10 engages into the notch 5*b* of the locking bar and thus prevents any displacement of the locking bar 5 (FIG. 2). Pulling of the pull rope 8 does not result in any displacement of the locking bar 5. Displacement of the locking bar 5 is only possible if the swingable suspension means 20 is swung after the lowering of the load (FIG. 3) in which case the nose piece of the lever 14 moves off the thickened portion of the bearing ring. Due to this the displacement bolt 10 is forced out of the notch 5*b* under the force of the spring 11. It is now possible to pull the pull rope and thus bring the locking bar 5 out of the locking position, with the result that the holding bolt 2 passes out of the locking position as a result of the force exerted by the spring 3.

Figure 4:
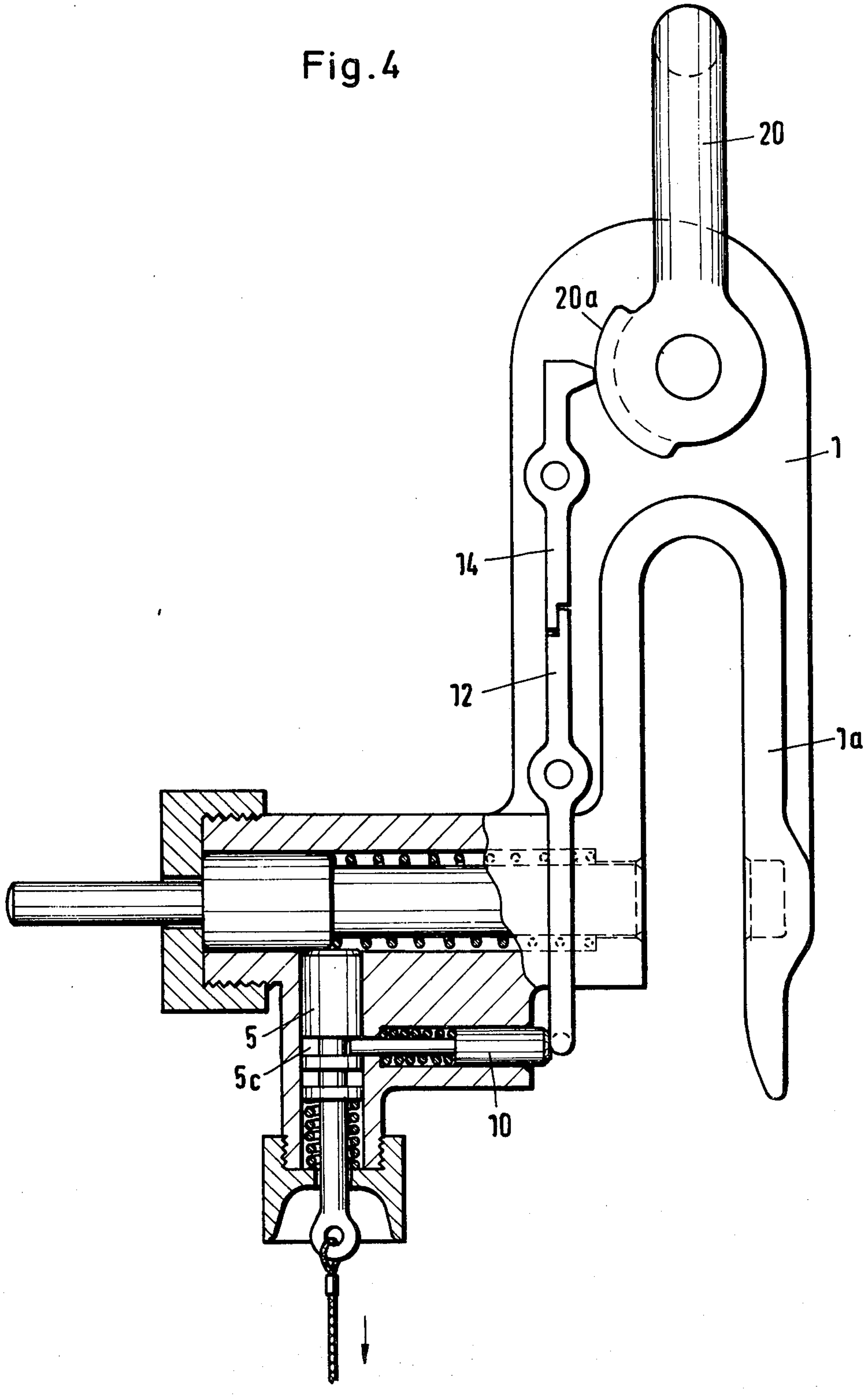
FIG. 4 shows the load stop device without load with the suspension means in transport position.

In order that the displacement bolt can be displaced upon the lifting of the load stop device without load, a second notch 5*c* is provided on the locking bar 5, into which second notch the displacement bolt 10 can engage. The control members 29 then assume the position which they would normally assume upon the lifting of the load (FIG. 4).

Figure 5:
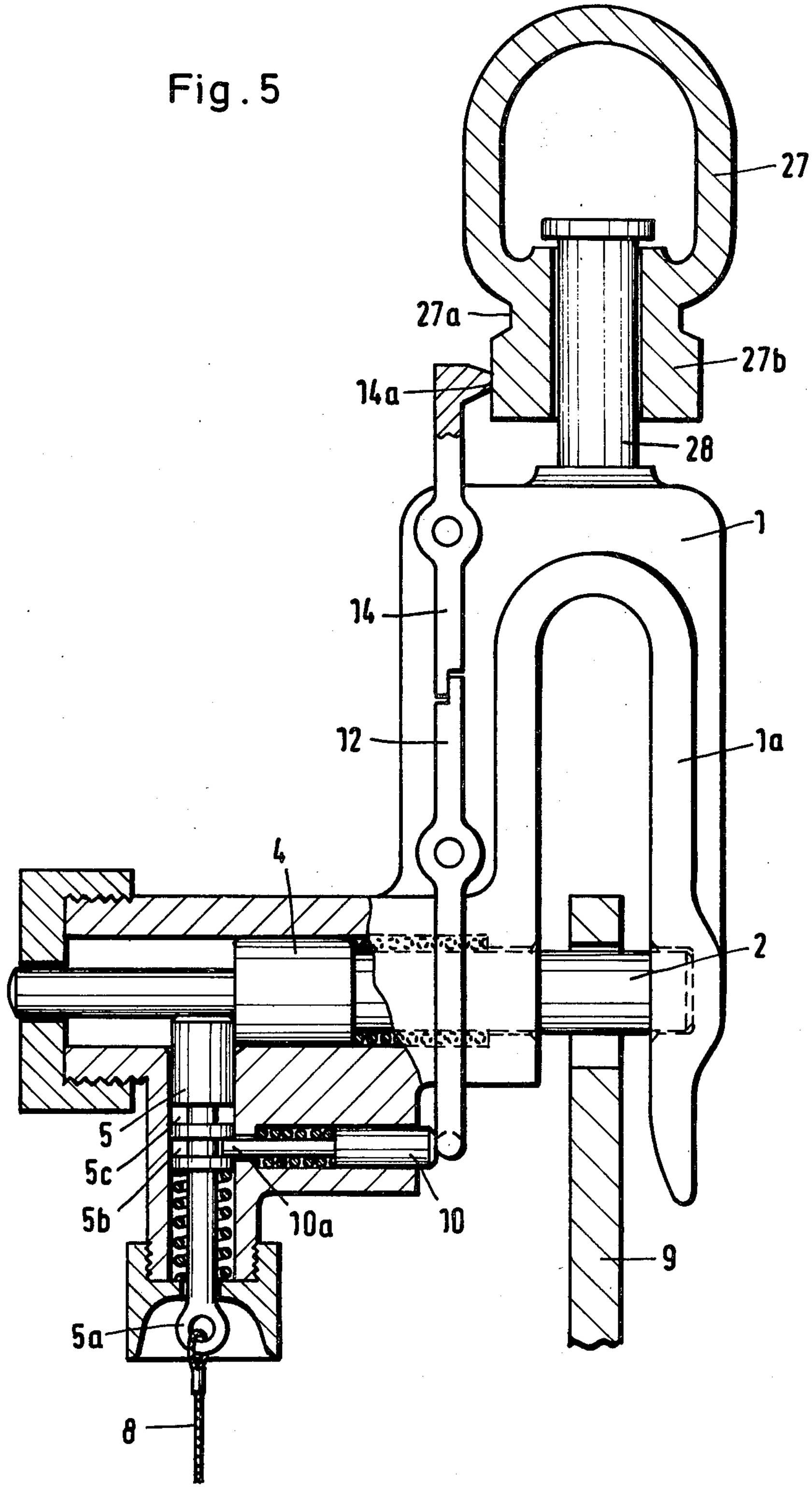
FIG. 5 shows the locked load stop device with, however, a suspension means of a different development.

FIG. 5 shows a different embodiment of the suspension means. In this case the mobility of the suspension means is not obtained by swinging the suspension means but by longitudinal displacement thereof. The suspension means 27 is here mounted for longitudinal displacement on the neck piece 28. The neck piece 28 is arranged on the housing 1. The suspension means 27 has a widened portion 27*b* which adjoins the narrowed portion 27*a*.

Figure 6:
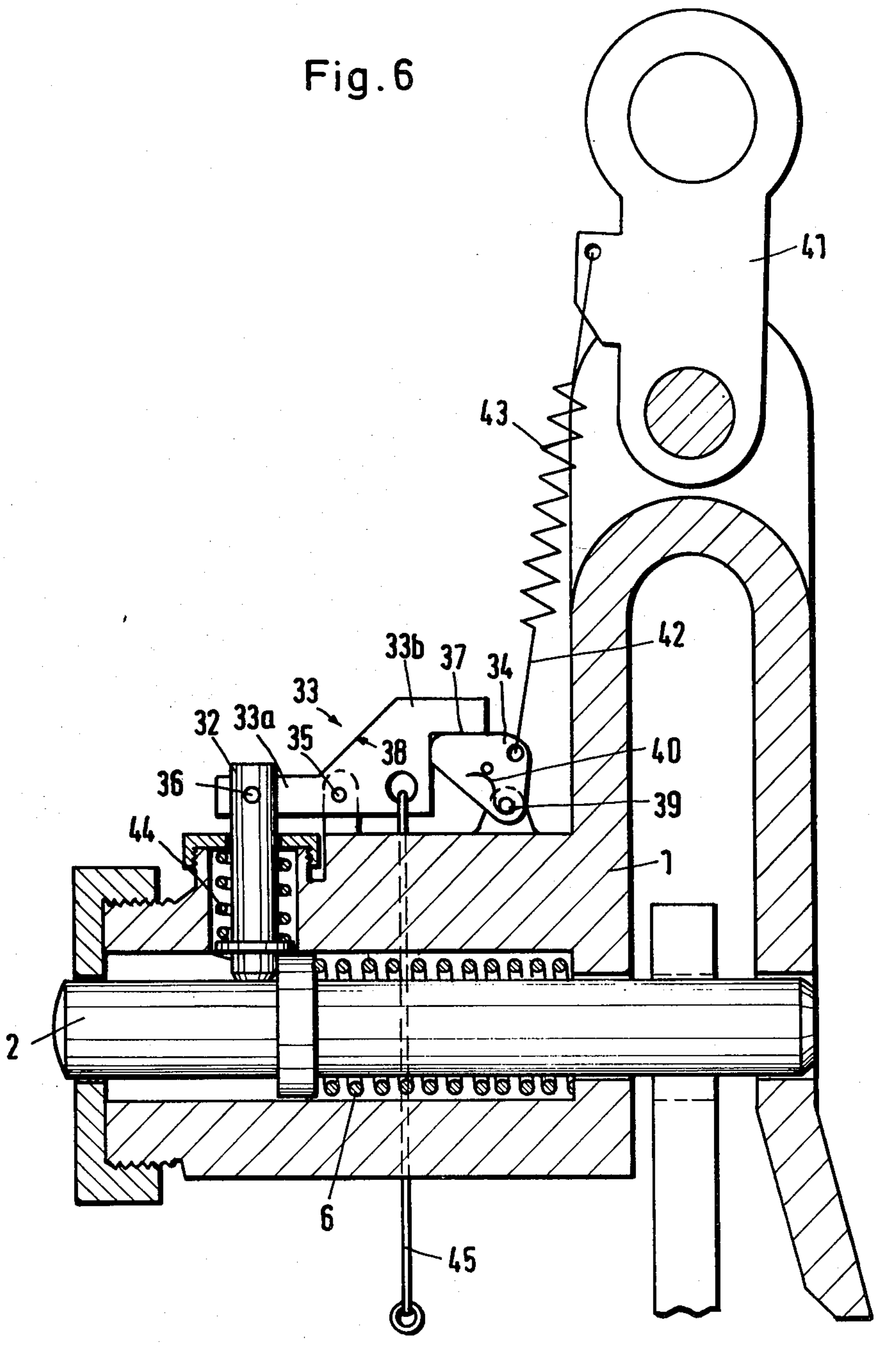
FIGS. 6–8 show another embodiment of the load stop device.
Figure 7:
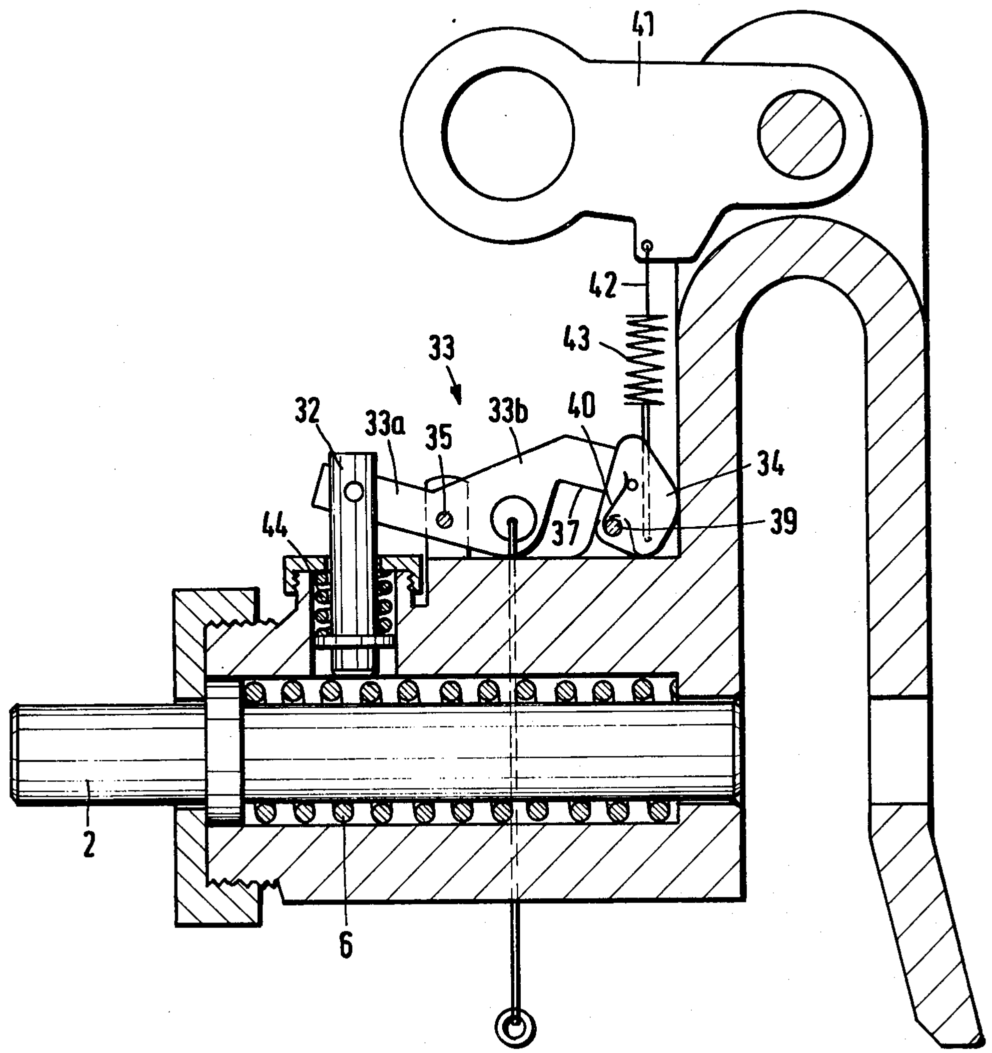
Figure 8:
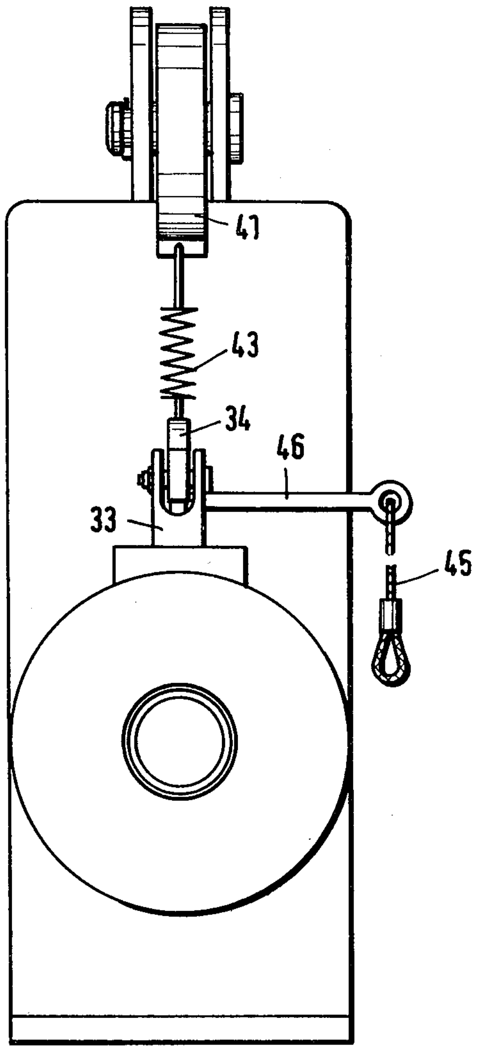

Upon the displacement of the suspension means 27, the nose piece 14*a* can thus travel on the one hand into the narrow portion 27*a* and on the other hand along the widened portion 27*b*, thus producing control movements corresponding to those in the embodiment in accordance with FIGS. 1 to 4. FIGS. 6 to 8 show a different embodiment of the load stop device. In this embodiment, the catch is a swing lever 33 which is articulated to the locking bar 32 whose swinging movement can be blocked by a control projection 34. The swing lever and the control projection form the control members by means of which the locking bar 32 is controlled by the suspension means.

The embodiment is constructed in detail in the manner that the swing lever 33 is swingable around the shaft 35 arranged on the housing 1 and has two arms 33*a* and 33*b*. The locking bar 32 is pivoted at 36 to the arm 33*a*. The other arm of the swing lever 33 has a stop surface 37 which lies on the side of the swing lever which is opposite the blocking movement of the swing lever if it is assumed that the direction of the blocking movement is indicated by the arrow 38.

The control projection 34 is swingable around the shaft 39 fastened to the housing 1. The control projection 34 is subjected to the force of the leaf spring 40 which urges the control projection into the release position around the shaft 39. The control projection 34 is connected to the suspension means 41 by a connecting means 42including a spring 43.

When the holding bolt 2 has assumed the locking position, as is shown in FIG. 6, the locking bar 32 passes into locking position as a result of the force exerted by the spring 44 and locks the holding bolt 2 in place. In this case the swing lever 33 has assumed a position in which it is possible for the control projection to come under the one arm 33*b* of the swing lever 33 upon the lifting of the load and consequently the swinging of the suspension means 41, so that the control projection thus rests against the stop surface 37. The pull rope 45 cannot be actuated in this case.

If the load is lowered the suspension means 41 is swung as a result of the spring 43. The control projection 34 due to its spring 40 passes into the release position (FIG. 7) leaving the stop surface 37. In this position the swivel lever 33 can be actuated by means of the pull rope 45. As a result, the lever 32 passes out of the locking position, with the result that the holding bolt 2 is withdrawn by means of the spring 6. The load is then released.

FIG. 8 shows the load stop device of FIGS. 6 and 7 from the side. It can be seen that the pull rope 45 acts on the swing lever 33 by means of an arm 46.

What is claimed is:

1. Load support apparatus comprising a housing, suspension means mounted on said housing for movement between an operative load suspension position and an inoperative relaxed position, a holding bolt displaceably mounted in said housing for movement along a displacement path between a first position in which a load is supported by the holding bolt and a second position in which the load is released from the bolt, displaceable locking bar means mounted in said housing for movement transversely to the displacement path of the holding bolt for engaging said bolt to lock the same in said first position, catch means displaceably mounted on said housing for locking the locking bar means, and control means responsive to the position of the suspension means for displacing the catch means to lock the locking bar means in its position in which the holding bolt is locked in said first position thereof when the suspension means is in its operative load suspension position.

2. Load support apparatus as claimed in claim 1 comprising spring means acting on said locking bar means for moving the same into engagement with said bolt.

3. Load support apparatus as claimed in claim 2 wherein said catch means comprises a spring-loaded displacement bolt supported in said housing for movement transversely of the path of travel of said locking bar means.

4. Load support apparatus as claimed in claim 1 wherein said control means comprises a pair of double armed levers respectively pivotably connected to said housing, one of said levers being engaged with said suspension means to undergo pivotal movement as said suspension means travels between said operative and inoperative positions, the other of said levers being engaged with said catch means to displace the same responsive to the travel of said suspension means, said levers being engaged to form a toggle joint.

5. Load support apparatus as claimed in claim 4 wherein said levers have engaging ends with cutouts which form said toggle joint.

6. Load support apparatus as claimed in claim 1 wherein said locking bar means comprises a locking bar provided with spaced notches respectively adapted for receiving the catch means.

7. Load support apparatus as claimed in claim 1 wherein said suspension means comprises a pivotable member on said housing including a control portion engaged by said control means.

8. Load support apparatus as claimed in claim 7 wherein said control portion comprises a thickened region on said pivotable member.

9. Load support apparatus as claimed in claim 1 wherein said suspension means is longitudinally displaceable relative to said housing, said control means including an element secured to said suspension means and comprising narrow and widened portions.

10. Load support apparatus as claimed in claim 9 wherein said control means further includes pivotable lever means on said housing engageable with said element and with said catch means.

11. Load support apparatus as claimed in claim 1 wherein said catch means comprises a swing lever on said housing pivotably connected to said locking bar means and a control projection on said housing subject to the displacement of the suspension means for blocking pivotal movement of said swing lever when the suspension means is in operative position and said locking bar means locks said holding bolt.

12. Load support apparatus as claimed in claim 11 wherein said swing lever includes first and second arms, said locking bar means being pivotably connected to one of said arms, the other of said arms having a stop surface engageable by said control projection.

13. Load support apparatus as claimed in claim 12 wherein said stop surface is on said other of said arms of the swing lever on a side thereof opposite the direction of blocking movement of the swing lever.

14. Load support apparatus as claimed in claim 11 wherein said control projection is pivotable on said housing, said catch means further comprising a spring connecting the control projection to said suspension means to produce pivotal movement of the control projection in response to movement of the suspension means.

* * * * *